United States Patent

[11] 3,613,957

[72] Inventor Wilhelm E. Walles
 Midland, Mich.
[21] Appl. No. 770,848
[22] Filed Oct. 25, 1968
[45] Patented Oct. 19, 1971
[73] Assignee The Dow Chemical Company
 Midland, Mich.

[54] RESINOUS ENCLOSURE MEMBERS RENDERED IMPERMEABLE BY SULFONATION AND NEUTRALIZATION
17 Claims, No Drawings

[52] U.S. Cl. .................................................. 220/64,
 117/62.1, 117/94, 117/95, 117/118, 117/138.8 R, 117/138.8 E, 117/138.8 UA, 8/108
[51] Int. Cl. ..................................................... B65d 25/34, B65d 25/00
[50] Field of Search ............................................ 117/94, 95, 106, 72, 138.8, 138.8 E, 138.8 UA, 118; 215/1; 220/64

[56]  References Cited
 UNITED STATES PATENTS
2,832,697 4/1958 Walles .......................... 117/69
2,832,699 4/1958 Walles .......................... 117/69
2,985,542 5/1961 Pinsky et al. ................. 117/138.8
2,979,422 4/1961 Bersin et al. .................. 117/62.1

Primary Examiner—Alfred L. Leavitt
Assistant Examiner—Edward G. Whitby
Attorneys—Richard G. Waterman, Griswold & Burdick, Lester J. Dankert and Benjamin G. Colley ABSTRACT: Resinous enclosure members are disclosed which are surface sulfonated and neutralized to the extent that they contain about 0.001 milligram to about 50.0 milligrams of sulfonate groups per square centimeter wherein the groups are selected from ammonium sulfonate, metal sulfonate and substituted quaternary nitrogen sulfonate groups. The treated enclosure members are rendered substantially impervious to the penetration of various solvents, gases, and vapors by this treatment. The enclosure members are useful to retain or transport hydrocarbon solvents, perfumes, fuels, etc. and thus can be used as gasoline tanks, perfume bottles, plastic hoses, etc.

3,613,957

RESINOUS ENCLOSURE MEMBERS RENDERED IMPERMEABLE BY SULFONATION AND NEUTRALIZATION

SUMMARY OF INVENTION

This invention relates to resinous enclosure members which have been rendered impermeable by a combination of sulfonation and neutralization. More particularly, this invention relates to the surface treatment of containers made of polymers such as polyethylene, polypropylene, polyvinyl chloride, polyisobutylene, polybutene-1, polymethyl pentenes, chlorinated polyethylene, chlorinated polypropylene, polyvinylidene chloride and blends of the foregoing in which the inner or outer or both surfaces have been rendered substantially impermeable to the transmission of low-molecular weight substances such as solvents, fuels, vapors, and gases.

Thus, this invention provides an enclosure member which is impermeable to the transmission of solvents, fuels, vapors, and gases and which consists essentially of solid, nonaromatic hydrocarbon polymers which have a hydrocarbon structure and have a plurality of free hydrogen atoms attached to the carbon atoms, in which the enclosure member has an inner and outer surface with at least one of the surfaces having a portion of the hydrogen atoms replaced by sulfonic acid salt groups so that it contains from about 0.001 to about 50.0 milligrams sulfonic acid salt groups per square centimeter wherein the cation of the salt is selected from ammonium, metal ions, substituted quaternary nitrogen groups, and mixtures thereof. The preferred enclosure members of this invention contain sulfonic acid salt groups wherein the group is ammonium, sodium, lithium, potassium, barium, iron (II), calcium, tin (II), magnesium, and mixtures thereof.

Examples of the low-molecular weight substances which can be contained or excluded by the subject containers are solvents such as lower alkanols, toluene, benzene, cyclohexane, xylene, methylchloroform, chloroform, and hexane; gases such as nitrogen, oxygen, helium, hydrogen, carbon dioxide, methane, ethane, propane, butane, Freons, fuels such as gasoline, kerosene, fuel oils; oils such as natural fatty oils, lubricating oils; and perfumes.

For the purposes of this invention, the term "enclosure members" is designed to be generic to bottles, boxes, tanks, envelopes, films and other containers having at least a portion of a wall member composed of a polymeric material having its surface sulfonated and neutralized in accordance with this invention.

BACKGROUND OF INVENTION

It is known to provide barrier properties for various plastic substrates such as polyethylene by coating the substrate with various synthetic resinous coatings. See for example U.S. Pat. Nos. 2,836,319; 2,979,422; 2,985,542; 3,199,701; 3,279,940; 3,282,729 and 3,294,577. It is further known to provide an inorganic chemical treatment of the plastic substrates to provide barrier properties. See for example U.S. Pat. Nos. 2,446,536 and 2,811,468.

It is well known to sulfonate the surface of various plastic substrates to enhance the adhesion of coatings, dyes, etc. See for example, U.S. Pat. Nos. 2,400,720; 2,786,780; 2,786,783; 2,832,697; 2,832,698; 2,832,699; 2,858,237; 2,979,177 and 2,937,066.

It is also known to surface sulfonate nonaromatic hydrocarbon polymers to provide a vapor barrier on the polymer substrate of a considerable degree.

DETAILED DESCRIPTION

It now has been discovered that nonaromatic hydrocarbon polymers which consist of a linear hydrocarbon backbone molecular structure with nonaromatic substituents can be sulfonated and neutralized to achieve a further enhancement in the impermeability of said polymers. It further has been discovered that a specific range of sulfonation will achieve the desired results. Thus, when the polymeric substrate has been sulfonated and neutralized so that it contains from about 0.001 mg. to about 50.0 mg. sulfonic acid salt groups per square centimeter, the desired effects are obtained. When the polymer is sulfonated so that it contains less than this amount the desired barrier properties are not obtained or are substantially reduced. When the polymer is sulfonated so that more than this range is obtained there is a substantial loss in tensile strength. The improvement in the impermeability of the sulfonated, and neutralized polymeric substrate over the sulfonated substrate varies from about three times to about 10,000 times greater.

It has further been discovered that the color sometimes associated with surface-sulfonated plastics can be substantially bleached away without removing much of the sulfonate groups. Hence, the barrier properties of the sulfonated plastic are not affected by bleaching.

This invention has great practical utility since by following the teachings of this invention it is possible to make substantially impermeable containers out of the relatively cheap, flexible, nonaromatic, plastics such as polyethylene, polypropylene, polyvinyl chloride, etc. Thus, by using this invention it is possible to make plastic gasoline tanks for automotive vehicles; plastic aerosol cans for holding such diverse items as whipping cream, starch, insecticides, perfume, etc.; plastic films to lay on the ground and retain fumigants applied to the ground thereunder; plastic hoses for transferring liquid fuels and solvents such as gasoline, dry cleaning solvents, kerosene, etc., and plastic facepieces for gas masks that are both cheap and effective to keep out noxious gases and aerosols.

The polymeric enclosure members which can be sulfonated and neutralized in accordance with this invention are extruded or molded of thermoplastic nonaromatic hydrocarbon polymers which have a linear hydrocarbon backbone molecular structure with only nonaromatic substituents and have a plurality of free hydrogen atoms attached to the carbon atoms of the polymer chain. Examples of these thermoplastic extrusion grade or moldable grade nonaromatic hydrocarbon polymers are homopolymers of ethylene, propylene, isobutylene, butene-1, methyl pentene-1, vinyl chloride, vinylidene chloride, interpolymers of the foregoing monomers with each other, chlorinated polyethylene, chlorinated polypropylene, and blends of the foregoing polymers and copolymers.

Prior to the actual molding or extrusion operation, the above moldable polymer can be mixed with or compounded with the usual antioxidants, pigments, dyes, or extenders known to the art without impairing the subsequent sulfonation step since the latter is a surface treatment.

It is to be understood that the specific range of sulfonation to be used will be dependent upon the material which is to be retained in the enclosure member. In other words, the degree of sulfonation is generally inversely related to the size of the molecule of the contents of the enclosure i.e. penetrant. However, the chemical similarity or dissimilarity of the penetrant and the polymer or polymer surface making up the enclosure is the overriding factor. For example, it is known that with a film of unsulfonated butadiene—acrylonitrile copolymer the permeation rate of nitrogen is 0.0042 cc./100 in.$^2$/atm./day/mil while a larger molecule, methyl ethyl ketone has a permeation rate of 6100 or a rate of about 1.5 million times as fast. Thus, for a gasoline container or gas tank, the range of sulfonation can be from 0.001 to 1.0 mg. $SO_3$ per cm.$^2$. If one desires to make a plastic dispenser wherein methylene chloride or one of the Freons to be retained therein, the degree of sulfonation must be higher i.e. in the range from about 0.1 to 20 mg. $SO_3$ per cm.$^2$.

The plastic surface after treatment with the liquid sulfonating agents has a color varying from jet black to colorless depending upon the degree of sulfonation and the exact sulfonating agent used. In sulfonating the plastic surfaces with a vapor phase sulfonation agent such as the sulfur trioxide diluted with an inert gas such as air, the sulfonation can proceed without any noticeable color formation and this later technique is thus preferred. Some polymers have a propensity to darken with sulfonation more than others. For example, polyethylene becomes brown with a moderate degree of sulfonation but the use of a low temperature reduces this tendency. Polyvinyl chloride is highly resistant to coloration upon sulfonation. However, with either technique the sulfonated plastic retains its inherent flexibility and impact resistance and the sulfonated outer layer or surface does not chip off or crack during mild flexure. Furthermore, the sulfonated surface cannot be easily scratched off by a sharp instrument or abraded.

It is sometimes desirable to remove or reduce this color due to sulfonation as in the case of plastic aerosol cans to hold starch, insecticides or perfumes which are to be sold to the consumer. This is accomplished by beaching with a bleaching agent such as aqueous solutions of sodium hypochlorite or hydrogen peroxide.

While the nature of the sulfonating process appears to be quite complex and theories as to how the reaction proceeds have little conclusiveness, it now seems that the reaction appears to be one of simultaneous oxidation and 3) associated with the barrier layer thus appears to be the result of a complex oxidation of the polymer so that it contains various oxidized groups such as hydroxy, keto, and carboxylic acid groups. It is further believed that these groups condense with one another to form the chromophoric groups responsible for the color above noted.

The preferred method of sulfonating the plastic substrates is to immerse them at room temperature in a tank containing a dry inert gas with about 0.1-5 percent by volume of sulfur trioxide ($SO_3$) mixed therein for a time varying from 1-20 minutes. Examples of inert gases to be used in this process are nitrogen, carbon dioxide, sulfur dioxide and air.

It is important to exclude water vapor from the above gases by a conventional drier tube since in the presence of water in a liquid or vapor form, the $SO_3$ is converted to droplets of sulfuric acid of a varying concentration and the sulfonation of the plastic is either inhibited or prevented. Concentrations of $SO_3$ above about 5 percent are unduly corrosive, dangerous to work with, and too reactive with the plastic substrates to give the operator time to treat the substrate uniformly. On the other hand, concentrations less than about 0.1 percent take an undue amount of time for adequate reaction. The preferred concentration is about 2 percent by volume with a contact time of about 3-10 minutes. The time and concentration are inversely related and that any combination of the above variables may be used to suit specific needs.

Other methods of sulfonating that may be used are liquid phase contact with a solution of $SO_3$ in a liquid polychlorinated aliphatic hydrocarbon such as methylene chloride, carbon tetrachloride, perchloroethylene, tetrachloroethane, and ethylene dichloride. Likewise, oleum, concentrated sulfuric acid containing about 98 percent by weight of $H_2SO_4$, and solutions of complexes of sulfur trioxide in chlorinated hydrocarbons may be used if desired. Examples of such complexes are those of $SO_3$ with pyridine, dioxane and thioxane.

The surface-sulfonated plastic substrates are then substantially completely neutralized by contacting them with a dilute aqueous solution of alkali metal hydroxides or salts of a corresponding weak acid; alkaline earth metal hydroxides or salts of a corresponding weak acid; heavy metal chlorides or sulfates; primary, secondary or tertiary amines; ammonium hydroxide; or mixtures thereof. The sulfonated plastic surfaces are dipped into the aqueous solutions or suspensions or are sprayed with the solutions, washed with water and dried.

It is also possible to neutralize the sulfonated plastics with vapor phase neutralization agents such as gaseous ammonia and methyl amine.

Examples of alkali metal hydroxides and weak acid salts which can be used are sodium hydroxide, potassium hydroxide, lithium hydroxide, sodium carbonate, sodium hypochlorite, sodium bicarbonate, sodium acetate, potassium carbonate, potassium bicarbonate, potassium acetate, lithium carbonate, lithium bicarbonate, and lithium acetate.

Examples of alkaline earth metal hydroxides or weak acid salts thereof are the water-soluble calcium, barium, strontium and magnesium hydroxides, carbonates, and acetates.

Examples of the heavy metal chlorides and sulfates are stannous chloride, ferrous sulfate, nickel sulfate, cobalt sulfate and manganese sulfate.

Examples of the amines which can be used are primary, secondary and tertiary saturated aliphatic amines of 2-5 carbon atoms which are water soluble and are normally liquids at room temperature. Specific examples are amylamine, dipropylamine, triethylamine, diethylamine, ethylamine, diethylmethyl amine, etc. Normally gaseous amines such as methylamine can also be used if desired.

In general, the above neutralizing agents are added to water in an amount such that the resulting solution contains about 1–20 percent by weight of the neutralizing agent.

The contact time is not critical and a mere dipping or spraying is sufficient.

The temperature at which the sulfonation and neutralization steps are carried out is not critical. It can range from −20° to 60° C. but a preferred temperature range is 20° to 40° C.

The pressure at which the sulfonation is carried out can be atmospheric, superatmospheric, or subatmospheric. Because of the convenience, it is preferred to carry out the sulfonation at atmospheric pressure. However, the reaction can also be carried out at a pressure of 1 to 10 pounds per square inch gage (p.s.i.g.).

The sulfonated plastic surfaces if colored may be lightened by a bleaching step and this may be used in place of the above neutralization step as it accomplishes substantially the same result. The plastic surfaces which have been given an intense liquid phase sulfonation treatment have a color rating of 17 or 18 on the Gardner Color Scale wherein a number value of 18 is very black and 1 is a very light straw color. Thus, it has been found that dark sulfonated plastic surfaces with a Gardner Color of 18 can be bleached to a color value of 2 or 3 by contacting them with an aqueous sodium hypochlorite solution of 1 to 5 percent by weight.

The following examples and comparative data show the improvement in impermeability of the plastic substrates effected by the present invention.

Example 1

A series of 500 cc. low-density polyethylene bottles (0.93 density) having walls 1 millimeter thick with screwcaps are filled with a solution of 1 percent by weight of sulfur trioxide in methylene chloride for 5 minutes at room temperature.

The bottles are then rinsed with pure methylene chloride and rinsed with a 3 percent by weight water solution of the salts and bases listed below. As controls, two bottles are not sulfonated and one is sulfonated and water washed only.

The bottles are then filled with 500 cc. of pure methylene chloride, capped, weighed and stored for 7 days at 23° C. The bottles are reweighed each day and the weight loss is recorded. The results are recorded in table I.

TABLE I

| Surface Treatment | $CH_2Cl_2$ Weight Loss in Gram/Day |
|---|---|
| | (Average for 7 Days) |
| None (Control) | 6.3 gram |
| None (Control) | 6.7 gram |
| Sulfonated, Water Washed Control | 2.4 gram |
| Sulfonated, $NH_4OH$ | 0.49 gram |
| Sulfonated + LiOH | 0.060 gram |
| Sulfonated + NaOH | 0.086 gram |
| Sulfonated + NaCl | 0.55 gram |
| Sulfonated + KOH | 0.59 gram |
| Sulfonated + $BaCl_2$ | 0.3 gram |

Results similar to the foregoing are obtained when the methylene chloride is replaced by gasoline, benzene, and other solvents.

If a greater degree of impermeability is desired, the bottles can be sulfonated on the outside also by rotating them in a 1 percent solution of sulfur trioxide in methylene chloride or by total immersion of the bottles in the sulfonating agent for 5 minutes.

Example 2

The procedure of example 1 is repeated with the neutralization of the sulfonated surface with the solutions listed below. Oxygen permeation rates are then run at 22° C. using a mass spectrometer to measure the permeated oxygen with duplicate results given in table II.

TABLE II

| Surface Treatment | Oxygen Permeability In cc. O$_2$/100 in$^2$/atm/day/mil | |
|---|---|---|
| None (Control) | 386 | 405 |
| Sulfonated Control | 135 | 112 |
| Sulfonated + Na OH | 6.1 | 4.9 |
| Sulfonated + Na Cl | 154 | 110 |
| Sulfonated + Li OH | 44 | 34 |
| Sulfonated + NH$_4$OH | 73 | 63 |
| Sulfonated + K Cl | 268 | 298 |
| Sulfonated + Ba Cl$_2$ | 183 | 163 |
| Sulfonated + Ca Cl$_2$ | 189 | 235 |
| Sulfonated + Mg Cl$_2$ | 181 | 214 |
| Sulfonated + Sn Cl$_2$ | 296 | 299 |
| Sulfonated + Fe SO$_4$ | 150 | 149 |

Example 3

The procedure of example 1 is repeated with neutralization of the sulfonated plastic surface with the solutions listed below. Carbon dioxide permeation rates are determined by the same procedure with the results given below in table III.

TABLE III

| Surface Treatment | CO$_2$ Permeability In cc. O$^2$/100 in$^2$/atm/day/mil |
|---|---|
| None (Control) | 1580 cc. |
| Sulfonated Control | 755 cc. |
| Sulfonated + Na OH | 58 cc. |
| Sulfonated Li OH | 290 cc. |
| Sulfonated + NH$_4$OH | 384 cc. |
| Sulfonated + Fe SO$_4$ | 665 cc. |

Example 4

The procedure of example 1 is repeated using 250 cc. low-density polyethylene bottles with the treatment varied as indicated below in table IV. The bottles are filled with 100 cc. of pure benzene. For additional comparison purposes one run of bottles was vapo. phase sulfonated internally with 2 percent by volume of sulfur trioxide in carbon dioxide for 3 minutes at 23° C.

Example 5

The procedure of example 1 is repeated with 8-ounce low-density polyethylene bottles in which some are sulfonated with 5 percent sulfur trioxide in methylene chloride for 13 minutes and some are neutralized with 1.4 percent by weight of aqueous sodium hydroxide the results over a period of 3 days at 23° C. using pure benzene as the penetrant are:

| | Weight loss in gms./day |
|---|---|
| Control | 2.00 |
| Sulfonated | 0.32 |
| Sulfonated and neutralized | 0.05 |

TABLE IV

| | | Wt. loss in grams | | | |
|---|---|---|---|---|---|
| Run | Treatment | 1 day | 2 days | 5 days | Average |
| 1 (Control) | None | 2.02 | 4.86 | 11.82 | 2.36 |
| 2 (Control) | do | 2.10 | 4.76 | 11.69 | 2.32 |
| 3 (Control) | do | 2.09 | 4.70 | 11.60 | 2.32 |
| 4 (Control) | do | 2.12 | 4.76 | 11.77 | 2.34 |
| 5 | Sulfonation with 2% SO$_3$ in CO$_2$ | 1.23 | 3.21 | 8.69 | 1.738 |
| 6 | do | 1.21 | 3.05 | 8.17 | 1.634 |
| 7 | do | 1.30 | 3.28 | 8.84 | 1.768 |
| 8 | Sulfonation as in runs 5-7 and rinsed with 1.4% by weight of aqueous NaOH. | 0.42 | 1.59 | 5.35 | 1.07 |
| 9 | do | .43 | 1.62 | 5.44 | 1.08 |
| 10 | do | .40 | 1.59 | 5.42 | 1.08 |
| 11 | Sulfonation with 2% SO$_3$ in methylene chloride for 3 minutes. | 1.70 | 4.09 | 10.53 | 2.10 |
| 12 | do | 1.63 | 3.95 | 10.27 | 2.04 |
| 13 | do | 1.69 | 4.13 | 10.61 | 2.12 |
| 14 | Sulfonation as in runs 11-13 and rinsed with 1.4% by weight of aqueous NaOH. | 1.26 | 3.28 | 8.75 | 1.75 |
| 15 | do | 1.29 | 3.34 | 8.82 | 1.76 |
| 16 | do | 1.42 | 3.59 | 9.29 | 1.85 |

Example 6

Pure benzene is used in the foregoing example as a convenient similant for gasoline which is known to vary in its composition from season to season and from one producer to another. In order to illustrate that comparable results are obtained with gasoline, bottles similar to those of example 5 are sulfonated with 10 percent by weight of sulfur trioxide in trichloroethylene for two different times; 1 minute and 10 seconds and are neutralized by rinsing with 1.4 percent aqueous sodium hydroxide. They are then filled with a winter grade of commercial regular gasoline. The results over a period of storage for 7 days at 23° C. are summarized below.

| | Loss rates in grams/day |
|---|---|
| Control | 2.25 |
| 10 second sulfonation+NaOH neutralization | 0.38 |
| 1 minute sulfonation+NaOH neutralization | 0.10 |

Example 7

Four experimental gasoline tanks are fabricated from rectangular sheets of 3/16-inch-thick polypropylene (melt flow 1.0; ASTM D-1238-65T, condition L; 6-65 percent crystallinity). The tanks are made by heating and bending a sheet of the polypropylene into a U-shaped channel which is then sealed onto flat sheets on the bottom and sides to form a tank holding about 12 gallons. The tanks are then provided with a sealable inlet opening.

Into three of these tanks are poured 2 gallons of a solution of 1 percent sulfur trioxide in methylene chloride. The fourth tank is untreated and acts as the control. The filled tanks are then sealed and agitated vigorously at 25° C. for 10 minutes.

After pouring out the reactant and water washing, 2 gallons of 3 percent by weight aqueous solutions of sodium hydroxide, potassium hydroxide, and ammonium hydroxide is poured into each of the three treated tanks respectively. These filled tanks are again sealed and agitated for 5 minutes, emptied, water washed, and dried.

Each of the four tanks are then filled with 11 gallons of regular grade gasoline, sealed, weighed, and placed in a ventilated hood for 20 days with periodic and final weighing. It is found that results similar to example 1 are obtained.

Example 8

Tanks similar to those of example 7 are made up and internally treated in the same manner and then given the same external treatment i.e. sulfonated and neutralized internally and externally by the same reactants. When these tanks are filled with gasoline, sealed and stored for 20 days, it is found that a substantial reduction in the permeation rate is obtained over that of example 7.

By following the above examples, one can obtain equally good results with containers or films molded or extruded from the aforementioned polymers and blends thereof.

I claim:

1. An enclosure member substantially impermeable to the transmission of solvents, fuels, vapors, and gases consisting essentially of solid, nonaromatic hydrocarbon polymers which have a linear hydrocarbon structure and have a plurality of free hydrogen atoms attached to the carbon atoms, said member having an inner and outer surface, at least one of said surfaces having a portion of the hydrogen atoms replaced by sulfonic acid salt groups so that it contains from about 0.1 to about 50.0 milligrams sulfonic acid salt groups per square centimeter wherein the cationic moiety of the salt is selected from the group consisting of ammonium, metal ions, substituted quaternary nitrogen groups, and mixtures thereof.

2. The enclosure member of claim 1 in which the cationic moiety is selected from the group consisting of ammonium, sodium, lithium, potassium, barium, iron (II), calcium, tin (II), magnesium, and mixtures thereof.

3. The enclosure member of claim 1 wherein the polymers are selected from the group consisting of
   a. homopolymers of ethylene, propylene, isobutylene, butene-1, methyl pentene-1, vinylidene chloride, vinyl chloride,
   b. chlorinated polyethylene and chlorinated polypropylene,
   c. interpolymers of the monomers set forth in (a) and
   d. blends of the foregoing polymers and interpolymers.

4. A substantially gasoline-impermeable nonaromatic hydrocarbon polymer tank having at least one of the inner and the outer surfaces sulfonated and neutralized to the extent of from about 0.10 to about 1.0 milligram sulfonate radicals per square centimeter wherein said radicals are selected from the group consisting of sulfonates of ammonium, sodium, lithium, potassium, barium, iron (II), calcium, tin (II), magnesium and mixtures thereof.

5. The tank of claim 4 in which the inner surface is sulfonated and neutralized.

6. The tank of claim 4 in which both the inner and outer surfaces are sulfonated and neutralized.

7. The tank of claim 4 in which the polymer is polyethylene.

8. The tank of claim 4 in which the polymer is polypropylene.

9. The tank of claim 5 in which the polymer is polyethylene.

10. The tank of claim 6 in which the polymer is polyethylene.

11. The tank of claim 5 in which the polymer is polypropylene.

12. The tank of claim 6 in which the polymer is polypropylene.

13. A gasoline tank of nonaromatic hydrocarbon polymer, said tank being substantially impermeable to gasoline and having at least one of the inner and outer surfaces thereof sulfonated and neutralized to the extent of from about 0.1 to about 50.0 milligrams of sulfonate radicals per square centimeter wherein the cationic moiety of the sulfonate radical is selected from the group consisting of ammonium, metal ions, substituted quaternary nitrogen groups and mixtures thereof.

14. A gasoline tank according to claim 13 which contains gasoline.

15. A hydrocarbon container of nonaromatic hydrocarbon polymer, said container being substantially impermeable to low molecular weight hydrocarbon substances and having at least one of the inner and outer surfaces thereof sulfonated and neutralized to the extent of from about 0.1 to about 50.0 milligrams of sulfonated radicals per square centimeter wherein the cationic moiety of the sulfonate radical is selected from the group consisting of ammonium, metal ions, quaternary nitrogen groups and mixtures thereof.

16. A hydrocarbon container according to claim 15 which contains a low-molecular weight hydrocarbon substance selected from the group consisting of lower alkanols, toluene, benzene, cyclohexane, xylene, methyl chloroform, hexane, methane, ethane, propane, butane, gasoline, kerosene, fuel oils, dry cleaning solvents, natural fatty oils, lubricating oils and perfumes.

17. A method for containing a low-molecular weight hydrocarbon substance selected from the group consisting of lower alkanols, toluene, benzene, cyclohexane, xylene, methylchloroform, chloroform, hexane, methane, ethane, propane, butane, gasoline, kerosene, dry cleaning solvents, fuel oils, natural fatty oils, lubricating oils and perfumes which comprise the steps of (1) sulfonating and neutralizing at least one of the inner and outer surfaces of a container consisting essentially of nonaromatic hydrocarbon polymer to the extent of from about 0.1 to about 50.0 milligrams of sulfonate radicals per square centimeter wherein the cationic moiety of the sulfonate radical is selected from the group consisting of ammonium, metal ions, quaternary nitrogen groups and mixtures thereof and (2) placing said hydrocarbon substance into the resulting container.

PO-1050
(5/69)

UNITED STATES PATENT OFFICE
CERTIFICATE OF CORRECTION

Patent No. 3,613,957     Dated 19 October 1971

Inventor(s) Wilhelm E. Walles

It is certified that error appears in the above-identified patent and that said Letters Patent are hereby corrected as shown below:

Column 3, line 22, delete "3)" and insert -- sulfonation. The color --.

Signed and sealed this 9th day of May 1972.

(SEAL)
Attest:

EDWARD M. FLETCHER, JR.
Attesting Officer

ROBERT GOTTSCHALK
Commissioner of Patents